United States Patent
Shen

[11] Patent Number: 5,611,744
[45] Date of Patent: Mar. 18, 1997

[54] BICYCLE CRANK DRIVEN CHAIN WHEEL ASSEMBLY

[75] Inventor: Naichang Shen, Chengdu, China

[73] Assignee: Sichuan Xinxin Mechanical Engineering Co., Ltd., Chengdu, China

[21] Appl. No.: 391,669

[22] Filed: Feb. 20, 1995

[30] Foreign Application Priority Data

Feb. 22, 1994 [CN] China ............... 94227207.2

[51] Int. Cl.$^6$ ................................... B62M 3/06
[52] U.S. Cl. ........................... 474/141; 474/164
[58] Field of Search ............... 474/69, 71, 141, 474/152, 164, 273, 902

[56] References Cited

U.S. PATENT DOCUMENTS

| | | | |
|---|---|---|---|
| 3,487,706 | 1/1970 | Resener | 474/902 X |
| 3,828,621 | 8/1974 | Uchino | 474/273 X |
| 4,599,079 | 7/1986 | Chappell | 474/80 |
| 5,033,991 | 7/1991 | McLaren | 474/78 |
| 5,035,678 | 7/1991 | Hageman | 474/69 X |
| 5,213,550 | 5/1993 | Wu | 474/160 |
| 5,279,524 | 1/1994 | Hilber | 474/69 |

FOREIGN PATENT DOCUMENTS

| | | |
|---|---|---|
| WO93/01967 | 2/1993 | Canada . |
| 86205354U | 5/1987 | China . |
| 2044239U | 9/1989 | China . |
| 2046484U | 10/1989 | China . |
| 2051964U | 1/1990 | China . |
| 2104181U | 5/1992 | China . |
| 2131787Y | 5/1993 | China . |
| 64514 | 3/1946 | Denmark . |
| 638409 | 7/1935 | Germany . |
| 266781 | 8/1929 | Italy . |
| 459932 | 10/1950 | Italy . |
| 1752643A2 | 8/1992 | U.S.S.R. . |
| 18888 | 8/1913 | United Kingdom . |
| 752442 | 7/1956 | United Kingdom . |
| 2246985 | 2/1992 | United Kingdom . |
| 2246829 | 2/1992 | United Kingdom . |
| WO93/19977 | 10/1993 | WIPO . |
| WO93/19976 | 10/1993 | WIPO . |

*Primary Examiner*—Roger J. Schoeppel
*Attorney, Agent, or Firm*—Wigman, Cohen, Leitner & Myers, P.C.

[57] ABSTRACT

A bicycle crank driven chain wheel assembly uses a special-shaped chain wheel. The chain wheel has portions of different driving radii. The portion having smaller driving radii is engaged in transmission when the bicycle runs on slopes, so that the bicycle rider can drive the bicycle with smaller force. The portion having larger driving radii carries out transmission when the bicycle runs on flat road, so that the bicycle can be speeded up. The crank is mounted in such a manner that it can rotate with respect to the chain wheel within predetermined range of angle, so as to select the corresponding portion of the chain wheel to be engaged in transmission in accordance with the resistance to motion of the bicycle or with the condition of the road on which the bicycle runs. Thus, a variable transmission can be automatically achieved corresponding to the resistance to motion of the bicycle or to the condition of the road.

2 Claims, 4 Drawing Sheets

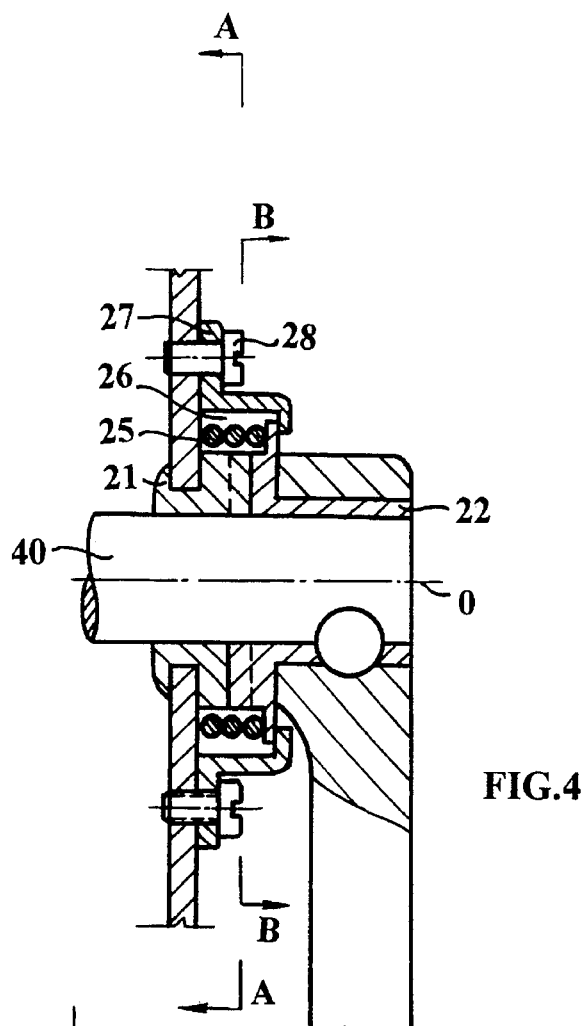
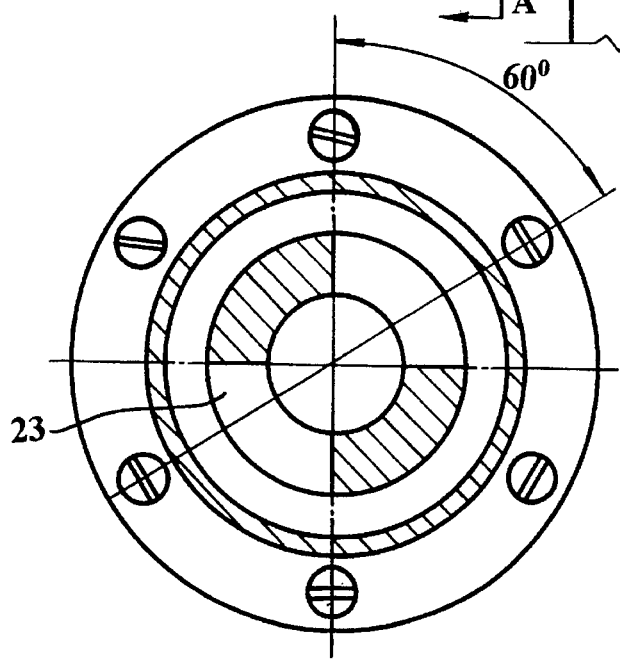
FIG.5
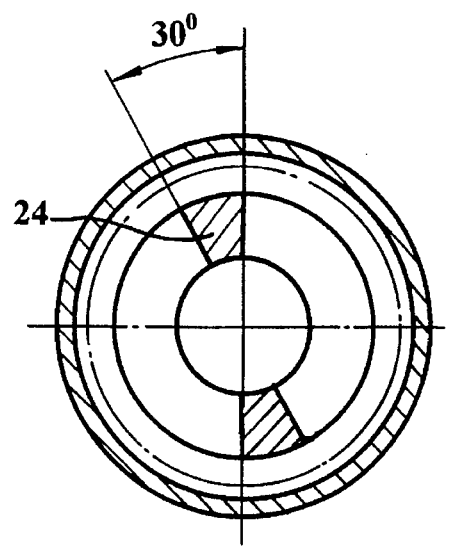
FIG.6

5,611,744

BICYCLE CRANK DRIVEN CHAIN WHEEL ASSEMBLY

TECHNICAL FIELD

The invention relates generally to bicycle chain transmissions, and more particularly to a bicycle crank driven chain wheel assembly for carrying out a variable transmission.

BACKGROUND ART

So far, the bicycle crank driven chain wheel assembly usually uses circle-shaped chain wheels. The circle-shaped chain wheel has a constant driving radius. In order to obtain a variable transmission, it is necessary to provide several driving or driven chain wheels, and the bicycle rider must manually shift the chain wheels.

OBJECTS OF THE INVENTION

An object of the invention is to provide a bicycle crank driven chain wheel assembly which can achieve a variable transmission with one driving chain wheel.

Another object of the invention is to provide a bicycle crank driven chain wheel assembly which can carry out the transmission with variable driving radii in accordance with the resistance to motion of the bicycle.

A further object of the invention is to provide a bicycle crank driven chain wheel assembly which can automatically carry out the transmission with smaller driving radii as the bicycle runs on slopes to save the bicycle rider's force or labor, and with larger driving radii as the bicycle runs on flat road to speed up the bicycle.

SUMMARY OF THE INVENTION

The principal of the invention for achieving the above objects is based on such a fact that, during a bicycle rider exerts force on the crank to rotate the driving chain wheel a round (360°), the rider's each foot effectively and positively drive the crank to rotate only in a zone less than half a round (I call this zone "effectively driving zone" hereinafter); and that, if the driving chain wheel is so designed and arranged that it consists of several sections or portions having different driving radii and these sections are alternatively engaged in transmission corresponding to the driving rotation of the crank within the effectively driving zone, a variable transmission can be achieved with this driving chain wheel.

According to the present invention, the foregoing and other objects and advantages are attained by a bicycle crank driven chain wheel assembly.

In accordance with an aspect of the invention, the bicycle crank driven chain wheel assembly comprises a chain wheel, a crank for driving the chain wheel and a device for mounting the crank on the chain wheel in a manner that the crank can rotate in a predetermined range of angle with respect to the chain wheel in accordance with variation of the torque exerted on the crank. The teeth of the chain wheel defines an imaginary closed pitch circle which comprises a first portion and a second portion. Each of the first and second portions comprises a force (or labor) saving section and a speed increasing section connected at one end to one end of the force saving section. The other ends of the force saving section and speed increasing section of the first portion are connected respectively to the other ends of the speed increasing section and force saving section of the second portion to form the closed pitch circle. The distances from every point in each force saving section and speed increasing section to the rotation axis of the chain wheel are continuously variable, so that the chain wheel has variable driving radii. The minimum distance from each speed increasing section to the rotation axis is larger than or equal to the maximum distance from each force saving section to the rotation axis, so that the speed increasing section has larger driving radii than that of the force saving section.

In accordance with another aspect of the invention, each of the force saving sections comprises a first curve, a second curve connected at one end to the first curve and a straight line connected tangentially at one end to the other end of the second curve. The straight line is connected taugentially at the other end to the respective speed increasing section. The minimum distance from the first curve to the rotation axis of the chain wheel is larger than or equal to the maximum distance from the second curve to the rotation axis, so that the first curve has larger driving radii than that of the second curve.

The bicycle crank driven chain wheel assembly of the present invention, thus, can achieve both a force saving transmission when the force saving section having smaller driving radii of the chain wheel is engaged in transmission as the bicycle rider drives the crank within the effectively driving zone, and a speed increasing transmission when the speed increasing section having larger driving radii of the chain wheel is engaged in transmission as the bicycle rider drives the crank within the effectively driving zone.

It can be understood that the bicycle crank driven chain wheel assembly can achieve two force saving transmissions and two speed increasing transmissions during the chain wheel turns one round, thereby to form an optimum driving cycle of force saving, speed increasing, force saving and then speed increasing. The so called "force saving transmission" means that the bicycle rider may drive the bicycle with smaller force or less labor by means of smaller driving radii. The so called "speed increasing transmission" means that the bicycle may be speeded up by means of larger driving radii.

The force saving effect of the invention is obvious especially when a bicycle rider rides the bicycle on a slope or with heavy load. In this condition, the driving force necessarily exerted on the crank can be reduced up to 25–35%.

The device for mounting the crank on the chain wheel ensures the assembly of the invention to automatically alter the force saving section and speed increasing section of the chain wheel for carrying out the transmission so as to automatically achieve a variable transmission in accordance with the resistance to motion of the bicycle or with the condition of road.

Furthermore, the assembly of the invention is simple in structure and adapted for mass production.

Other objects and advantages of the present invention will become readily apparent to those skilled in this art from the following detailed description of the preferred embodiment of the invention with reference to the accompanying drawings.

BRIEF DESCRIPTION OF THE DRAWINGS

FIG. 4 is a partial longitudinal section view of the assembly showing the connection between the chain wheel and the crank.

FIG. 5 is a cross-section view along the arrowed line A—A of FIG. 4.

FIG. 6 is a cross-section view along the arrowed Line B—B of FIG. 4.

DETAILED DESCRIPTION OF THE PREFERRED EMBODIMENT OF THE INVENTION

Figure 1:
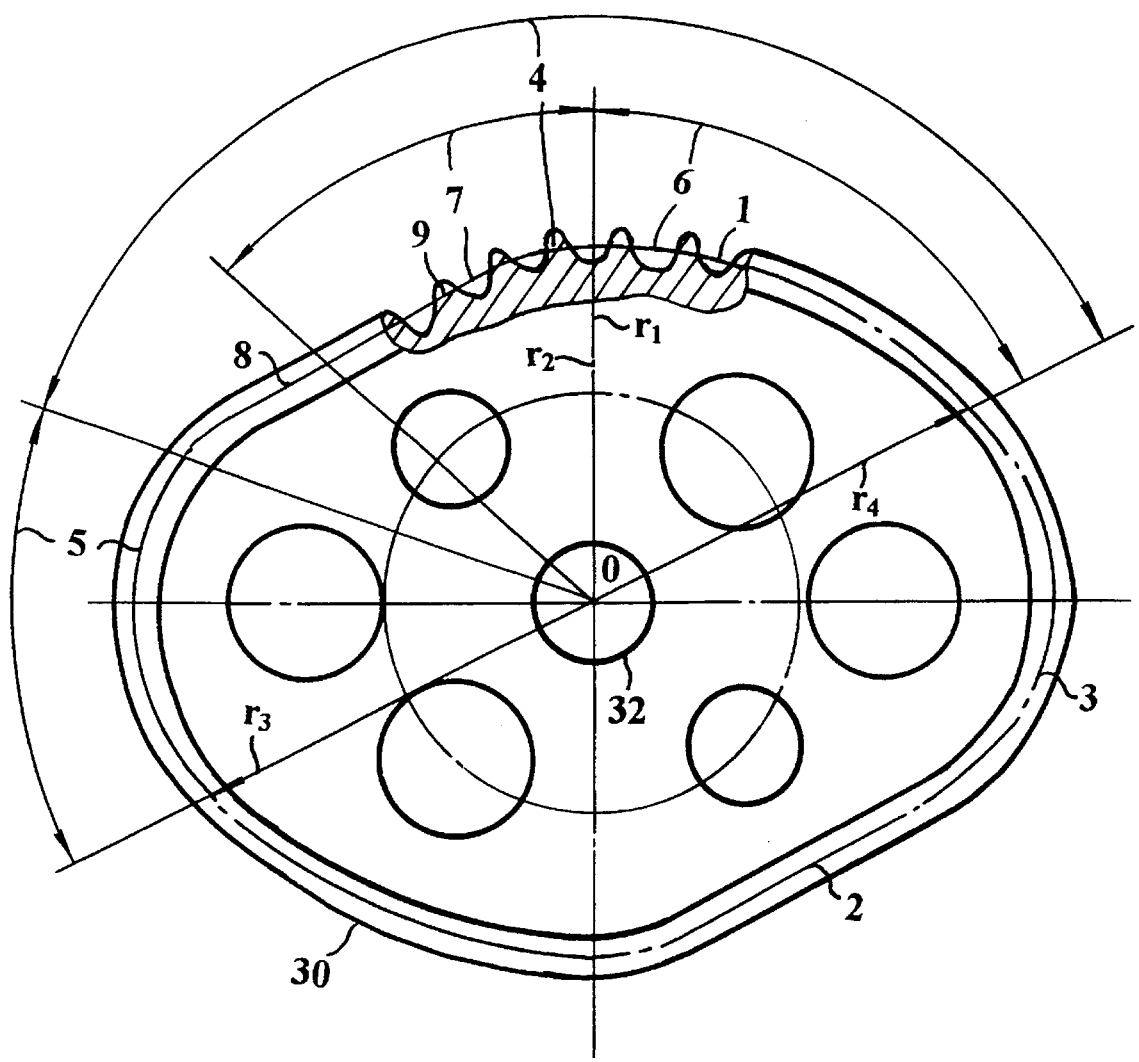
FIG. 1 is a schematic elevation view with partial cross-section showing an embodiment of the special-shaped chain wheel in accordance with the present invention.

FIG. 1 shows a chain wheel 30 which has a central boss 32 and teeth 9 on and along its outer rim. Teeth 9 defines an imaginary closed pitch circle 3 consisting of two portions 1 and 2 which are identical with each other. Each of portions 1 and 2 comprises a force saving section 4 and a speed increasing section 5. The force saving section 4 and speed increasing section 5 of portion 1 are connected respectively to the speed increasing section 5 and force saving portion 4 of portion 2 to form the closed pitch circle 3. Each force saving section 4 preferably consists of an initial curve 6, an optimum curve 7 and a straight line 8. The straight line 8 are connected tangentially at two opposite ends to the optimum curve 7 and the respective speed increasing section 5. The distances from every point in each force saving section 4 and speed increasing section 5 to the rotation axis O of the chain wheel are continuously variable (the distances are called "driving radii" hereinafter). Each force saving section 4 has relatively smaller driving radii than that of each speed increasing section 5, and each initial curve 6 has larger driving radii than that of each optimum curve 7. More specifically, the minimum driving radius $r_1$ of each initial curve 6 is larger than or equal to the maximum driving radius $r_2$ of each optimum curve 7, and the minimum driving radius $r_3$ of each speed increasing section 5 is larger than or equal to the maximum driving radius $r_4$ of each initial curve 6.

Thus, when each force saving section 4 having smaller driving radii is engaged in transmission, a bigger force of periphery can be produced, whereby the bicycle rider may drive the bicycle using the chain wheel with smaller force or less labor. On the contrary, when each speed increasing section 5 having larger driving radii is engaged in transmission, a bigger transmission ratio can be produced, whereby the bicycle can be speeded up.

Teeth 9 of the chain wheel may has a standard pitch, such as 12.7 mm. The profile of the tooth can be formed in accordance with GB 1244-76 (the Chinese National Standard). The number of teeth 9 can be selected depending on the uses. If the chain wheel is used on a bicycle often running on slopes or with heavy load, the chain wheel may have 34 or 38 teeth. Otherwise, 42 or 46 teeth, even 48 or 54 teeth are adaptable.

Figure 2:
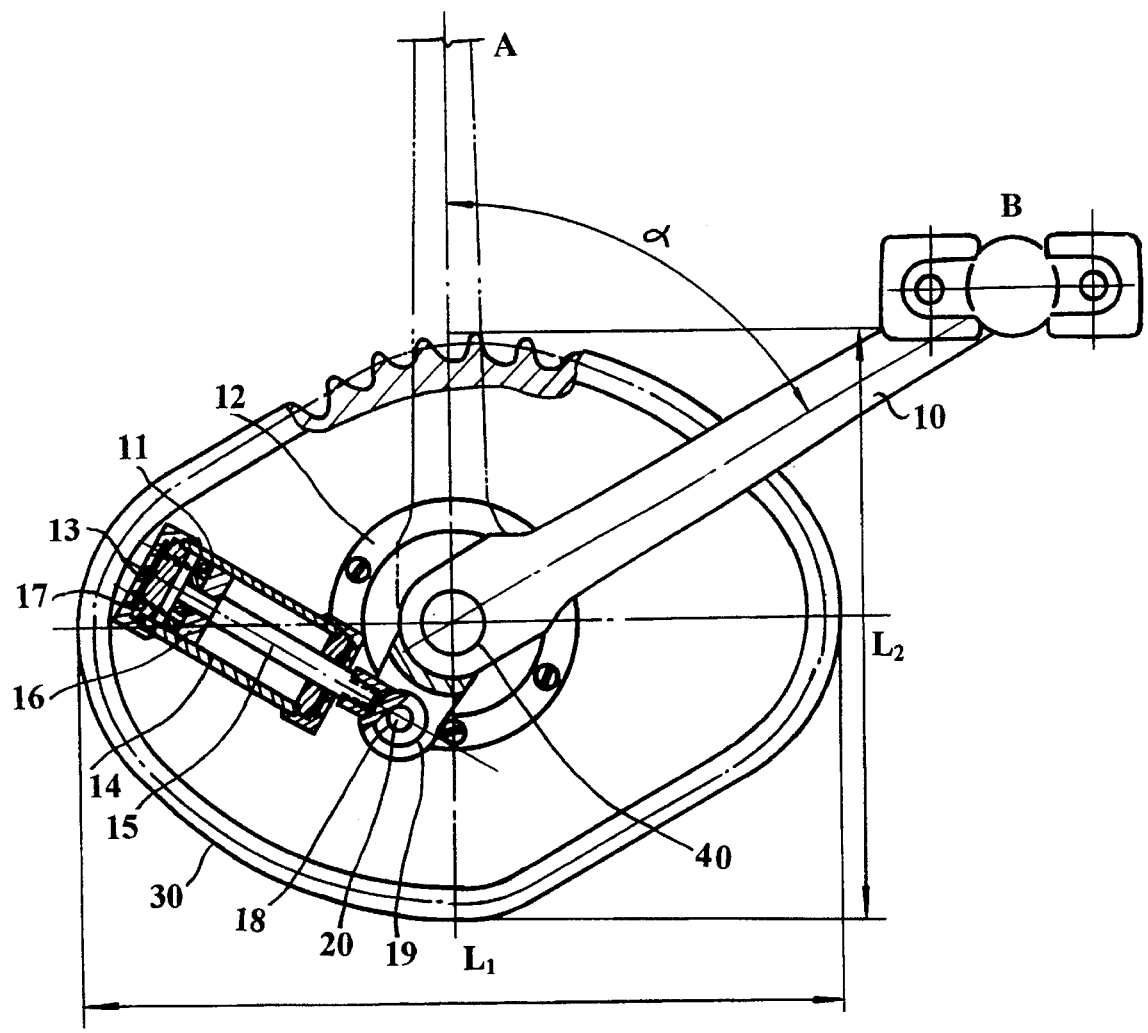
FIG. 2 is a schematic elevation view with partial cross-section of an embodiment of the bicycle crank driven chain wheel assembly in accordance with the present invention, and showing the assembly in the mode of force saving transmission.

As shown in FIG. 2, the chain wheel 30 has a long axis $L_1$ defined by a connecting line of two opposed points Which are respectively in the opposed speed increasing sections 5 and have the maximum driving radius, and a short axis $L_2$ defined by a connecting line of two opposed points which are respectively in the opposed initial curves 6 and have the minimum driving radius. Preferably, the long axis $L_1$ and the short axis $L_2$ are satisfied with the relation of $L_1.L_2=(1.20-1.35).1$.

Figure 3:
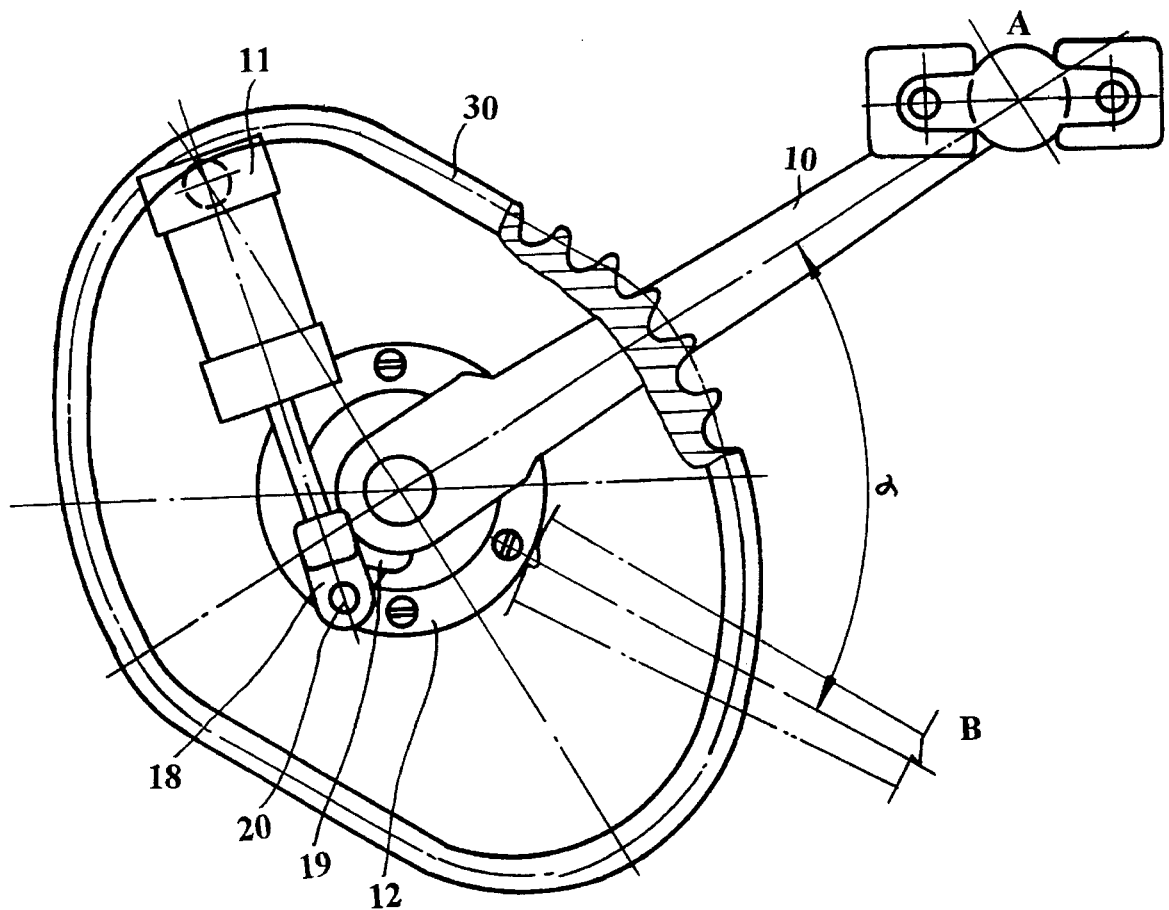
FIG. 3 is similar to FIG. 2, but showing the crank driven chain wheel assembly in the mode of speed increasing transmission.

FIGS. 2 and 3 show a bicycle crank driven chain wheel assembly in accordance with the invention. The assembly comprises a chain wheel 30 shown in FIG. 1 and a crank 10 for driving the chain wheel 30. Crank 10 has a crank shaft 40 fixed on the base end of crank 10. The crank shaft 40 is fitted in the central boss 32 of the chain wheel 30 so as to mount crank 10 on the chain wheel 30.

In accordance with the invention, crank 10 must be rotatable within a range of angle α with respect to the chain wheel 30. For this reason, the assembly is provided with a mechanism 11 for adjusting angle α and a mechanism 12 for limiting angle α. As shown in FIGS. 4–6, angle limiting mechanism 12 comprises essentially a chain wheel retaining ring 21 integrally connected with the central boss 32 of the chain wheel 30, a crank shaft retaining ring 22 integrally connected with the crank shaft 40, and a torsional spring 25 located between the retaining rings 21 and 22 and connected at its two opposite end respectively to the retaining rings 21 and 22. The chain wheel retaining ring 21 is provided on its face with two radially opposed sector recesses 23 (FIG. 5) each of which extends 90° in the peripheral direction of the retaining ring 21. Correspondingly, the crank shaft retaining ring 22 is provided on its face with two radially opposed sector protuberances 24 (FIG. 6) each of which extends 30° in the peripheral direction of the retaining ring 22. When the crank shaft 40 is fitted into the central boss 34 of the chain wheel 30, the sector protuberances 24 of the crank shaft retaining ring 22 are received in the sector recesses 23 of the chain wheel retaining ring 21. Therefore, crank 10 may rotate within a range of 0°–60° with respect to the chain wheel 30.

Moreover, a protection cover 27 is fastened to chain wheel 30 through screws 28 for preventing dust from entering into mechanism 12.

Now returning to FIGS. 2 and 3, mechaism 11 for adjusting angle α is described as follows. According to the invention, the angle α is formed by the short axis $L_2$ and the longitudial central line of crank 10 (as shown by the dotted line) in the rotation direction of the chain wheel 30. preferably, the angle α is 0°–60° as defined by the angle limiting mechanism 12.

The angle adjusting mechanism 11 comprises essentially a cylinder 14, a fixed end cover 13 secured to the bottom end of cylinder 14, a piston 16 with a piston rod 15 received in cylinder 14, and a compression spring 17 located between the end cover 13 and piston 16 for biasing piston 16. The outer end of the piston rod 15 is provided with a joint 18. A hinge bearing 19 is fixed on the crank shaft 40 of crank 10. Joint 18 and hinge bearing 19 are hinged through a hinge pin 20. Thus, crank 10 can swing with respect to the chain wheel 30 under the resultant action on the crank shaft 40 of the compression spring 17 and the driving force exerted by the bicycle rider. Mechanism 11 also serves the function of buffering when changing the position of crank 10 relative to the chain wheel 30.

The operation of the bicycle crank driven chain wheel assembly in accordance with the invention will be described as follows.

When the bicycle provided with the assembly of the invention is in static state, there is no force exerting on crank 10, crank 10 occupies a position A shown in FIGS. 2 and 3 under the action of the angle adjusting mechanism 11, i.e., the compression spring 17 biases crank 10 to position A through piston rod 15. At the starting stage of the bicycle, a large torque on crank 10 is needed and will rotate crank 10 with respect to the chain wheel 30 up to 60° in clockwise direction (i.e., the rotation direction) from the vertical position to a position B shown in FIG. 2 against the action of the angle adjusting mechanism 11 (i.e. against the biasing of the compression spring 17). The relative rotation of crank 10 is limited by the angle limiting mechanism 12. It can be seen from FIG. 2 that the force saving section 4 having smaller driving radii of chain wheel 30 will be engaged in transmission as crank 10 further rotates about 60° from position B in the clockwise direction. The range of the further rotation of about 60° from position B is so called effectively driving zone because the bicycle rider's foot cannot effectively and positively driving the chain wheel 30 beyond this zone. The effectively driving zone perferably begins at such a position that the longitudial central line of crank 10 forms an angle of 30° with the horizontal line in the rotation direction. In this stage, since the chain wheel 30 carries out the transmission with smaller driving radii, a bigger force of periphery can be produced, and it is possible for the rider to start the bicycle with a smaller force exerting on crank 10. Thus, a so called force saving transmission is achieved.

The situation of driving the bicycle on slopes is similar to the above starting stage. Therefore, the rider can easily drive the bicycle on the slopes with a relatively smaller force or less labor.

When the bicycle runs on flat road, the needed driving force becomes smaller. Thus, crank 10 will trend towards position A under the action of the angle adjusting mechanism 11 (i.e., under the biasing of the compression spring 17) as the driving force exerted on crank 10 decreases. It can be seen from FIG. 3 that the speed increasing section 5 having larger driving radii of the chain wheel 30 will be engaged in transmission as crank 10 continues to rotate in the clockwise direction about 60° from position A (i.e. in the effectively driving zone). Since the chain wheel 30 carries out the transmission with larger driving radii, it is possible for the bicycle rider to speed up the bicycle. Thus, a so called speed increasing transmission is achieved. As a result, crank 10 can swing with respect to the chain wheel 30 within 0°–60°, i.e., between positions A and B as showing in FIGS. 2 and 3, depending on the variation of the torque exerted on crank 10.

The provision of the straight line 8 in the force saving section 4 can achieve a prompt speed increasing when the force saving transmission is changed to the speed increasing transmission.

According to the above description, the bicycle crank driven chain wheel assembly of the invention can automatically change the mode of transmission corresponding to the resistance to motion of the bicycle or to the condition of the road on which the bicycle runs. In other wards, the assembly can automatically achieve a variable transmission with one special-shaped chain wheel of the invention in accordance with the resistance to motion of the bicycle or with the condition of the road, i.e., the assembly will carry out transmission with smaller driving radii when the bicycle runs on slopes and with larger driving radii when the bicycle runs on flat road.

In this disclosure, there is shown and described only the preferred embodiment of the invention, but it is to be understood that the invention is capable of use in various other combination and environments and is capable of changes or modification with the scope of the inventive concept as expressed herein.

What is claimed is:

1. A bicycle crank driven chain wheel assembly comprising:

a chain wheel having a central boss which defines a rotation axis of the chain wheel and teeth formed on and along the periphery of the chain wheel, wherein the teeth define an imaginary, symmetric, closed pitch curve, said curve comprises a first portion and a second portion wherein the first portion comprises a force saving section and a speed increasing section and the second portion comprises a force saving section and a speed increasing section wherein the force savings section comprises a first curve, a second curve connected to one end of the first curve and a straight line portion connected to the second curve, said straight line portion connected tangentially to one end of the respective speed increasing section and said first, and second curve and straight line portion being along the periphery of the chain wheel and the minimum distance, $r_1$, from the periphery of the chain ring of the first curve to the rotation axis of the chain wheel being greater than or equal to the maximum distance, $r_2$, from the periphery of the chain ring of the second curve to the rotation axis of the chain ring, and wherein the chain wheel has a long axis, $L_1$, defined by a connecting line of two points which are respectively in the opposed speed increasing sections and each point connected by the line which defines the maximum distance from the chain ring periphery to the rotation axis of the chain wheel and a short axis, $L_2$, defined by a connecting line of two points which are respectively in the opposed first curves of the force savings section and each of said points define the minimum distance, $r_1$, from the respective first curve to the rotation axis of the chain wheel and wherein the long axis, $L_1$, and the short axis $L_2$, being defined by a relationship in lengths of $L_1$ to $L_2$ in a range of ratios of approximately from about 1.20 to 1 to approximately 1.35 to 1, and the chain wheel is arranged in a sequence of sections comprising the force saving section, speed increasing section, force saving section and speed increasing section wherein the last speed increasing section is next to the first force saving section to form the closed pitch curve, the distances from every point on the closed pitch curve of the force saving section and the speed increasing section to the rotation axis of the chain wheel being continuously variable with variation along the pitch curve and the minimum distance, $r_3$, from each position along the pitch curve in the speed increasing section to the rotation axis of the chain wheel being greater than, or equal to the maximum distance, $r_4$, from each position along the pitch curve of the force saving section to the rotation axis of the chain wheel;

a crank having a crank shaft fixed on the crank for rotatably driving the chain wheel and means for mounting the crank shaft in the central boss of the chain wheel in a manner that the crank can rotate within a predetermined range of angles, $\alpha$, defined by the short axis $L_2$ of the chain wheel and the longitudinal central axis of the crank in the rotation direction of the chain wheel and a mechanism for limiting a range of the angle $\alpha$ with respect to the chain wheel in accordance with the amount of force exerted on the crank shaft; wherein the mechanism for adjusting the angle $\alpha$ comprises a cylinder fixed on the chain wheel, a piston received in the cylinder, a compression spring located in the cylinder for biasing the piston and a piston rod connected at one end to the piston, the other end of the piston rod being hinged with the chain wheel and a hinge bearing fixed on the crank shaft through a hinge pin, so that the crank can swing with respect to the chain wheel under the resultant action of the torque exerted on the crank shaft by both an external force and the compression spring.

2. The bicycle crank driven chain wheel assembly according to claim 1, wherein the mechanism for limiting the angle $\alpha$ comprises a chain wheel retaining ring fixed on the central boss of the chain wheel and having an first engaging face, a crank shaft retaining ring fixed on the crank shaft and having an second engaging face for engaging on the first engaging face, and a torsional spring connected at its two opposite ends respectively to the chain wheel retaining ring and the crank shaft retaining ring, the chain wheel retaining ring being provided on the first engaging face with two radially opposed sector recesses each of which extends 90 degrees in the peripheral of the retaining ring, and the crank shaft retaining ring being provided on the second engaging face with two radially opposed sector protuberances each of which extends 30 degrees in the peripheral direction of the retaining ring for fitting into the recesses so that the crank can rotate with respect to the chain wheel in a range of 0–60 degrees.

* * * * *